United States Patent
Norris et al.

(10) Patent No.: US 11,724,668 B1
(45) Date of Patent: Aug. 15, 2023

(54) INTEGRATED ALARM SYSTEMS FOR TRUCK BED COVERS

(71) Applicant: Toyota Motor Engineering & Manufacturing North America, Inc., Plano, TX (US)

(72) Inventors: Justin B. Norris, Brighton, MI (US); Frank A. Richards, Ann Arbor, MI (US); Alexander L. Paradis, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/572,063

(22) Filed: Jan. 10, 2022

(51) Int. Cl.
  *B60R 25/10* (2013.01)
  *B60R 25/34* (2013.01)
  *B60R 25/01* (2013.01)
  *B60R 25/102* (2013.01)

(52) U.S. Cl.
  CPC .............. *B60R 25/34* (2013.01); *B60R 25/01* (2013.01); *B60R 25/1001* (2013.01); *B60R 25/102* (2013.01); *B60R 2025/1016* (2013.01)

(58) Field of Classification Search
  CPC ..... B60R 25/34; B60R 25/01; B60R 25/1001; B60R 25/102; B60R 2025/1016
  See application file for complete search history.

(56) References Cited

U.S. PATENT DOCUMENTS

| | | | | |
|---|---|---|---|---|
| 4,795,206 A | * | 1/1989 | Adams | B60J 5/14 296/100.09 |
| 5,595,417 A | * | 1/1997 | Thoman | B60J 7/102 292/213 |
| 5,654,615 A | * | 8/1997 | Brodsky | B60J 7/20 296/136.01 |
| 5,678,869 A | * | 10/1997 | Yoshikuwa | E05B 77/34 292/216 |
| 6,288,511 B2 | | 9/2001 | Porter et al. | |
| 6,520,558 B1 | * | 2/2003 | Katterloher | B60J 7/1621 296/100.06 |
| 6,676,174 B2 | * | 1/2004 | Reynolds | E05B 47/026 292/169.14 |
| 6,712,418 B1 | * | 3/2004 | Lathers | B60J 7/1621 296/100.06 |
| 7,052,071 B2 | * | 5/2006 | Mulder | E05B 83/26 296/100.1 |
| 7,140,666 B2 | | 11/2006 | Wulf et al. | |

(Continued)

FOREIGN PATENT DOCUMENTS

DE    19716699 B4    8/2006

*Primary Examiner* — Nay Tun
(74) *Attorney, Agent, or Firm* — Dinsmore & Shohl LLP

(57) ABSTRACT

A vehicle includes a passenger cabin and a truck bed located rearward of the passenger cabin. The vehicle includes a truck bed cover that is sized to cover the truck bed and is movably attached to one or more walls of the truck bed to allow the truck bed cover to be moved between open and closed positions. The truck bed cover includes a latching device that engages a striker in the closed position. A sensing device is mounted in the truck bed that is configured to provide an indication of an open condition of the truck bed cover to a vehicle locking and security ECU. The locking and security ECU configured to provide an indication using an OEM security system of the vehicle when the open condition is detected.

12 Claims, 3 Drawing Sheets

(56) References Cited

U.S. PATENT DOCUMENTS

| | | | |
|---|---|---|---|
| 7,654,604 B2* | 2/2010 | Eichhorst | B60J 7/0573 296/136.04 |
| 7,739,977 B1* | 6/2010 | Lawrence | B60Q 9/00 116/28 R |
| 8,029,029 B2 | 10/2011 | Terhaar et al. | |
| 8,152,217 B2 | 4/2012 | Tanoi | |
| 8,844,995 B2 | 9/2014 | Nagao et al. | |
| 10,850,707 B1* | 12/2020 | Farmer | B60R 25/01 |
| 11,024,139 B1* | 6/2021 | Van Wiemeersch | B60R 25/1004 |
| 2001/0038218 A1* | 11/2001 | Clare | B60J 10/80 296/187.11 |
| 2001/0050484 A1* | 12/2001 | Kobayashi | E05B 85/26 292/216 |
| 2002/0105200 A1* | 8/2002 | Reynolds | E05B 47/026 296/3 |
| 2004/0032147 A1* | 2/2004 | Eichhorst | B60J 7/1855 296/121 |
| 2004/0222656 A1* | 11/2004 | Stevenson | B62D 33/0273 296/51 |
| 2006/0006701 A1* | 1/2006 | Wells | B60J 7/0573 296/223 |
| 2006/0119127 A1* | 6/2006 | Landrith | B60J 7/19 296/100.04 |
| 2007/0268300 A1* | 11/2007 | (Janet) | G05B 15/02 345/581 |
| 2008/0162003 A1* | 7/2008 | Eichhorst | B60J 7/0573 701/49 |
| 2009/0222174 A1* | 9/2009 | Frommer | E05F 15/77 296/146.4 |
| 2013/0224721 A1* | 8/2013 | Gilling | G09B 19/16 434/373 |
| 2014/0054920 A1* | 2/2014 | Jeffries | E05B 83/16 292/202 |
| 2015/0291017 A1* | 10/2015 | LaBiche | B60J 7/1204 296/100.1 |
| 2016/0052490 A1* | 2/2016 | Hardy | B60R 25/10 340/426.1 |
| 2016/0200375 A1* | 7/2016 | Kerr, III | B60J 7/198 296/100.09 |
| 2016/0236552 A1* | 8/2016 | Hannan | B60J 7/068 |
| 2016/0257248 A1* | 9/2016 | Lisseman | B60K 35/00 |
| 2017/0050522 A1* | 2/2017 | Secord | B60K 35/00 |
| 2017/0240033 A1* | 8/2017 | Dylewski, II | B60J 7/141 |
| 2017/0341494 A1* | 11/2017 | Hannan | B60J 7/068 |
| 2018/0029597 A1* | 2/2018 | Gage | F02D 13/02 |
| 2019/0128042 A1* | 5/2019 | Junod | B60J 7/1607 |
| 2020/0086931 A1* | 3/2020 | Zelent | B62D 33/042 |
| 2020/0269667 A1* | 8/2020 | Fargo | B60J 7/085 |
| 2020/0384839 A1* | 12/2020 | Matsumoto | B60J 10/80 |
| 2021/0025216 A1* | 1/2021 | Salter | E05F 15/71 |
| 2021/0155086 A1* | 5/2021 | Pattabhiraman | B60J 7/068 |
| 2021/0285266 A1* | 9/2021 | Carter | B60J 7/198 |
| 2021/0354537 A1* | 11/2021 | Kneifl | B62D 33/0273 |
| 2022/0065020 A1* | 3/2022 | Carter | B60Q 3/30 |

* cited by examiner

INTEGRATED ALARM SYSTEMS FOR TRUCK BED COVERS

TECHNICAL FIELD

The present specification generally relates to alarm systems for vehicles and, more specifically, to an alarm system that detects an open condition for truck bed covers and provides an indication to an operator of the vehicle when the truck bed covers are opened.

BACKGROUND

Pickup trucks often have open top truck beds that are exposed to environmental conditions, such as rain, sun, etc. Truck bed covers, sometimes referred to as tonneau covers, are known to cover the truck beds and provide some barrier to the environment and some added security for items in the truck bed. Different types of truck bed covers are available. One such truck bed cover is a single-piece panel that is hingedly connected on a forward wall on the truck bed. Another type of truck bed cover is formed as a flexible substrate that can be rolled and unrolled to cover the truck bed. Yet another type of truck bed cover is formed of multiple panels that are hingedly connected to one another to fold and unfold between open and closed positions.

Regardless of the type of truck bed cover, the truck bed covers may include a latching device. The latching device may latch to a region of the truck bed. Such a latching device can inhibit unintended opening of the truck bed cover and can also provide added security for items inside the truck bed. Unfortunately, the truck bed covers may be opened unintentionally or intentionally by an unauthorized person. Accordingly, what is needed are alarm systems that are integrated into the truck's original security system that can alert an operator of an open condition of the truck bed covers.

SUMMARY

In accordance with one embodiment, a vehicle includes a passenger cabin and a truck bed located rearward of the passenger cabin. The vehicle includes a truck bed cover that is sized to cover the truck bed and is movably attached to one or more walls of the truck bed to allow the truck bed cover to be moved between open and closed positions. The truck bed cover includes a latching device that engages a striker in the closed position. A sensing device is mounted in the truck bed that is configured to provide an indication of an open condition of the truck bed cover to a vehicle locking and security ECU. The locking and security ECU is configured to provide an indication using an OEM security system of the vehicle when the open condition is detected.

In another embodiment, a method of providing a truck bed cover alarm system for a truck bed cover that covers a truck bed of a vehicle is provided. The method includes mounting a sensing device in the truck bed. The sensing device is configured to provide an indication of an open condition of the truck bed cover. The sensing device is electrically connected to the locking and security ECU such that the sensing device provides the indication of the open condition of the truck bed cover to the locking and security ECU.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Vehicles according to the present specification include a passenger cabin and a truck bed located rearward of the passenger cabin. A truck bed cover is sized to cover the truck bed and movably attaches to walls of the truck bed to allow the truck bed cover to be moved between open and closed positions. The truck bed cover includes a latching device that engages a striker in the closed position. A sensing device is provided that is used to detect presence or absence or both of one or both of the truck bed cover and latching device and provides a signal or lack thereof to a vehicle locking and security ECU that is indicative of an open condition. The ECU may then provide an indication to an operator of the vehicle when an open condition is detected. The indication may be provided using the vehicle's original equipment manufacturer (OEM) security system.

Figure 1:
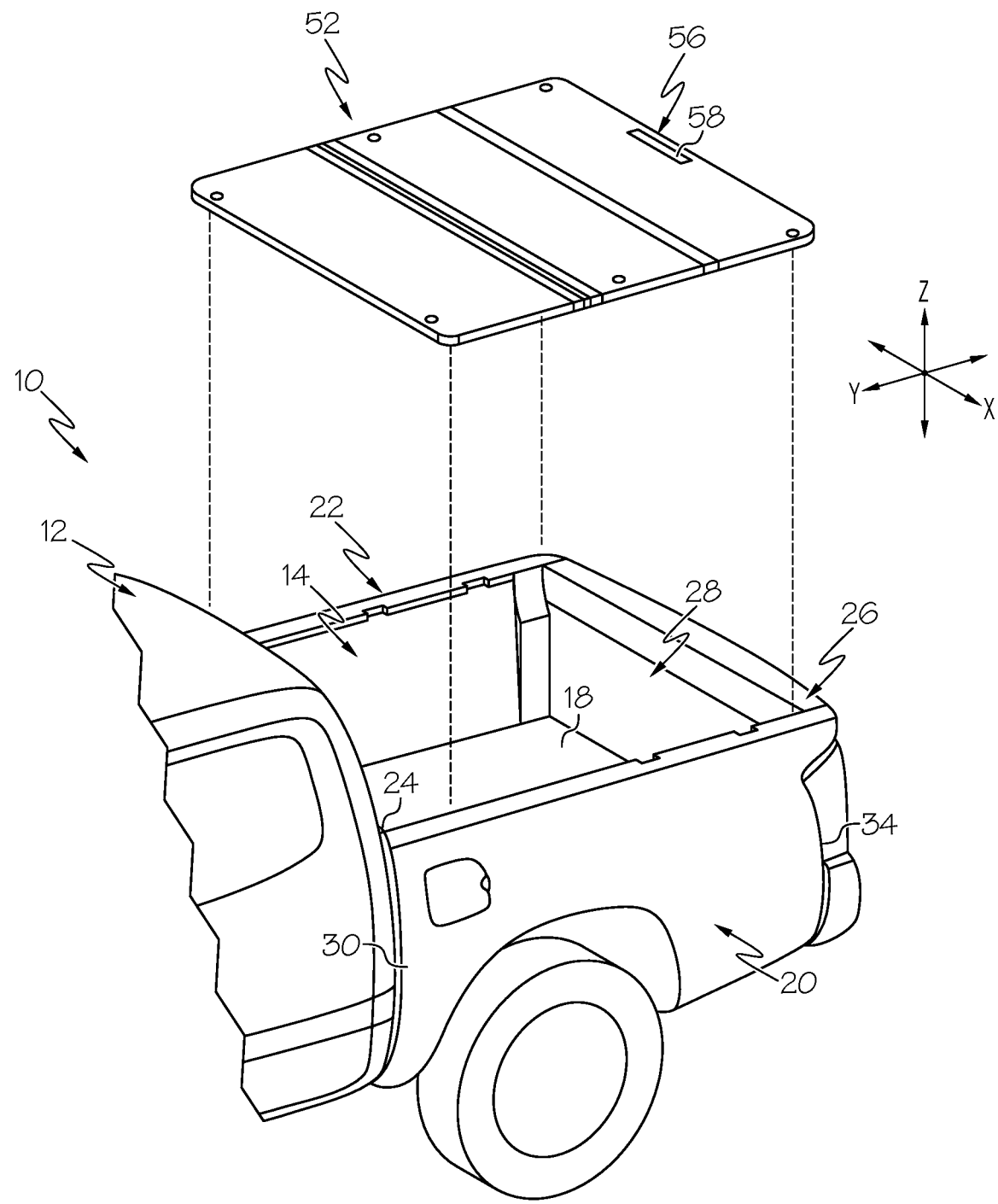
FIG. 1 schematically depicts a rear perspective view of a pickup truck having a truck bed with a truck bed cover, according to one or more embodiments shown and described herein.

As used herein, the term "vehicle longitudinal direction" refers to the forward-rearward direction of the pickup truck (i.e., in the vehicle Y direction depicted in FIG. 1). The term "vehicle lateral direction" refers to the cross-pickup truck direction (i.e., in the vehicle X direction depicted in FIG. 1), and is transverse to the vehicle longitudinal direction. The term "vehicle vertical direction" refers to the upward-downward direction of the pickup truck (i.e., in the vehicle Z-direction depicted in FIG. 1). As used herein, "upper," "over" and "above" are defined as the positive Z direction of the coordinate axis shown in the drawings. "Lower," "under," and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

A pickup truck 10 includes a passenger cabin 12 and a truck bed 14. The truck bed 14 includes a floor 18, a pair of spaced apart sidewalls 20, 22, a front wall 24, and a rear wall 26. The floor 18, the sidewalls 20, 22, the front wall 24, and the rear wall 26 define a storage area 28 of the truck bed 14. The sidewalls 20, 22 extend parallel to the vehicle longitudinal direction. Each sidewall 20, 22 includes a front end 30 and an opposite rear end 34. The front wall 24 extends between the front ends 30 of the sidewalls 20, 22. The rear wall 26 extends between the rear ends 34 of the sidewalls 20, 22.

In some embodiments, it is appreciated, that the rear wall 26 is pivotally connected to the sidewalls 20, 22 as a tailgate for movement between a closed position and an open position. In the closed position, the rear wall 26 extends parallel to the vehicle vertical direction. In the open position, the rear wall 26 extends parallel to the vehicle longitudinal direction.

A truck bed cover 52 is releasably connected to the sidewalls 20 and 22 and extends over the truck bed 14. The truck bed cover 52 includes at least one panel that is hingedly attached to the front wall 24 to allow for moving the truck bed cover 52 between open and closed positions. In the example of FIG. 1, the truck bed cover 52 is in the closed position and includes multiple panels that are hingedly attached to one another. In the closed position, the truck bed cover 52 may prevent opening of the rear wall 26 and allow opening of the rear wall 26 in the open configuration.

The truck bed cover 52 may include a latching device 56. The latching device 56 may include an actuator, represented by element 58, such as a handle, knob, button, etc. that can be used to place the latching device 56 in a closed or open configuration. For example, where the actuator 58 is a handle, the handle may be manually pulled, turned, etc., which moves a latching mechanism 60 (shown in FIG. 2) to the open configuration. The actuator 58 may be provided at any suitable location, such as underneath or on top of the truck bed cover 52. Where the actuator 56 is provided underneath the truck bed cover 52, it may be necessary to open the rear wall 26 to access the actuator 58. In these embodiments, the rear wall 26 may include a locking device that can be used to lock the rear wall 26 in the closed position. When the actuator 58 is moved, the truck bed cover 52 can then be lifted or otherwise moved to the open position and the truck bed 14 can be accessed. When desired, the truck bed cover 52 can then be closed by moving the truck bed cover 52 or otherwise moved to the closed position, which causes the latching mechanism 60 to move to its closed configuration. The latching mechanism 60 may move to the closed configuration automatically or manually depending on the type of latching mechanism provided.

Figure 2:
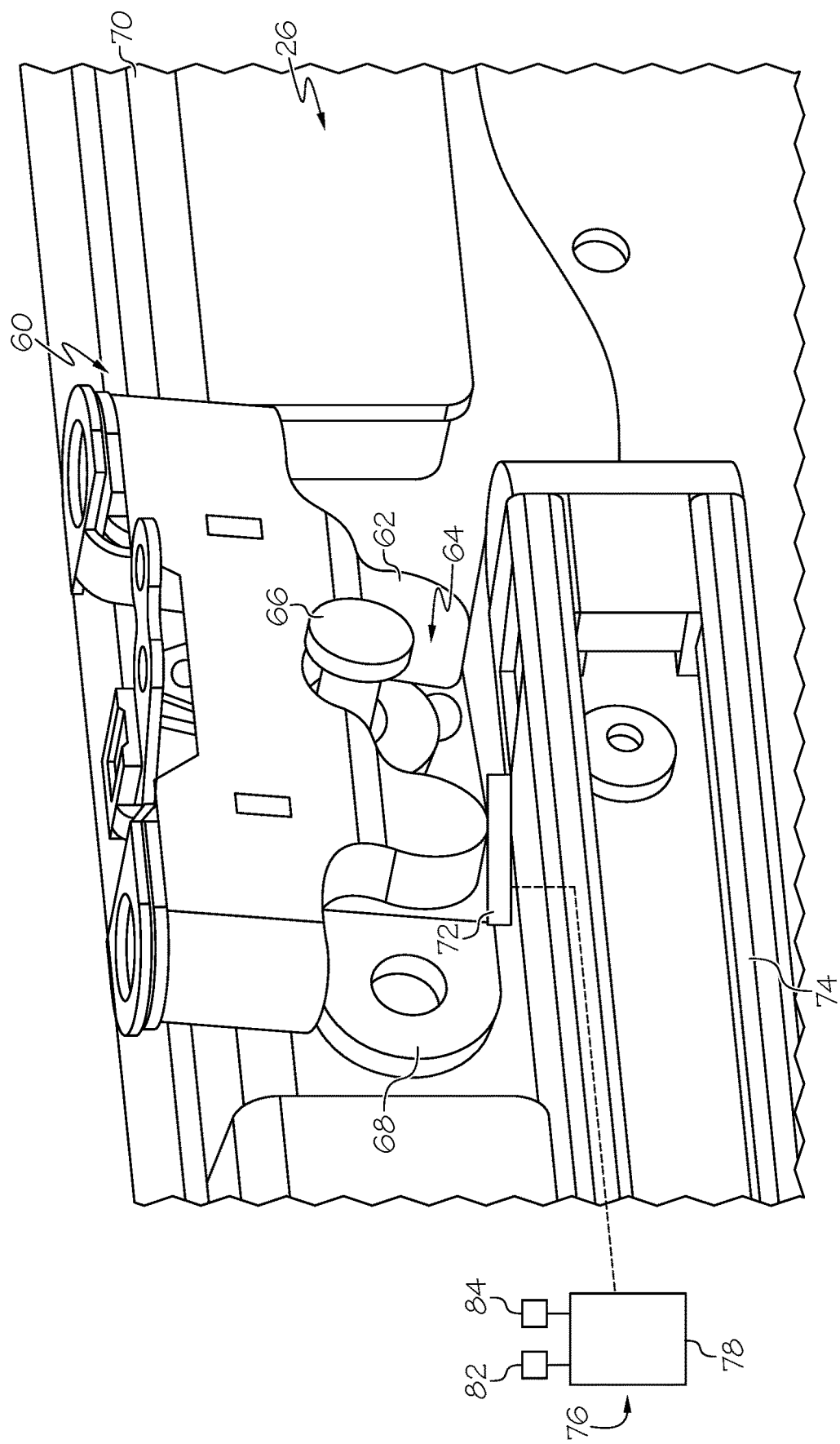
FIG. 2 is a diagrammatic view of a latching mechanism and a sensing device connected to the vehicle locking and security ECU, according to one or more embodiments shown and described herein.

Referring to FIG. 2, the exemplary latching mechanism 60 is shown. The latching mechanism 60, in this embodiment, includes a U-shaped latch arm 62 having a slot 64 that is sized and arranged to receive a striker pin 66 carried by a striker plate 68. The latch arm 62 may be moveable or have a moveable component that moves based on the position of the actuator 58 between the closed configuration, which prevents the release of the striker pin 66 from the slot 64 and opening of the truck bed cover 52, and the open configuration, which allows the release of the striker pin 66 from the slot 64 and opening of the truck bed cover 52. The striker plate 68 is shown mounted to a bed rail cap 70 of the rear wall 26 or may be mounted to the sidewalls 20 and 22 in some embodiments or any other suitable location.

A sensor 72 is located near the latching mechanism 60. In the illustrated embodiment, the sensor 72 is mounted to an accessory rail 74 that, in turn, is mounted to the rear wall 26. The sensor 72 may be any suitable type of proximity sensor (magnetic, mechanical, photoelectric, laser, camera) that provides a signal suitable to detect the presence and/or absence of the latching mechanism 60 at the striker plate 68. If the absence of the latching mechanism 60 is sensed by the sensor 72, a signal (or lack thereof) is provided to a control unit 76, such as a locking and security ECU 78 of the vehicle 10 that is indicative of an open condition of the truck bed cover 52. The term "open condition" can refer to one or both of the truck bed cover 52 being at least partially raised and the latching mechanism 60 being in the open configuration. For example, the sensor 72 may be located to detect when the latch arm 62 is moved from the closed configuration to the open configuration and/or when the truck bed cover 52 is moved toward its open position, which moves the latching mechanism 60 away from the striker plate 68.

The sensor 72 is electrically connected (e.g., wired or wireless as indicated by the dashed line) to the locking and security ECU 78. The locking and security ECU 78 is, in turn, electrically connected to one or both of an alarm 82, such as an audible alarm, and an indicator 84, such as a warning light or display device of the vehicle's OEM security system generally indicated by element 86. When the signal or lack thereof from the sensor 72 is detected by the locking and security ECU 78, the locking and security ECU 78 may activate one or both of the alarm 82 and the indicator 84. In some embodiments, the vehicle 10 may send an alert to the operator via a personal computing device, for example, through an application on a smartphone. In some embodiments, other vehicle systems may be activated, such as a camera system to record a video of the truck bed area. In some embodiments, the locking and security ECU 78 may activate the alarm 82 and indicator 84 only if one or more of the vehicle doors are in a locked state.

Figure 3A:
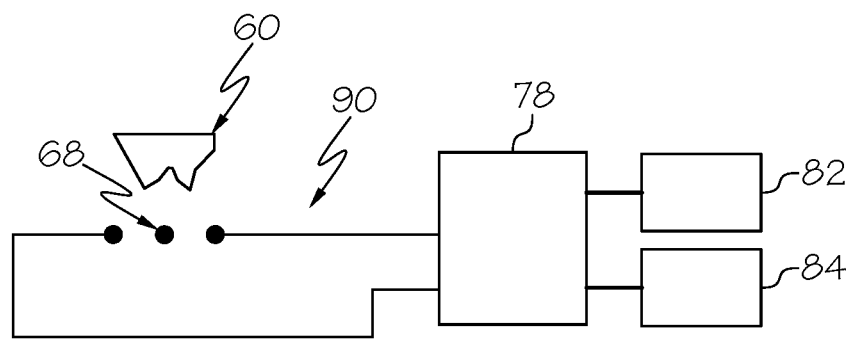
FIG. 3A is a diagrammatic illustration of a truck bed cover security arrangement that includes a circuit that acts as a sensing device when the circuit is opened, according to one or more embodiments shown and described herein.
Figure 3B:
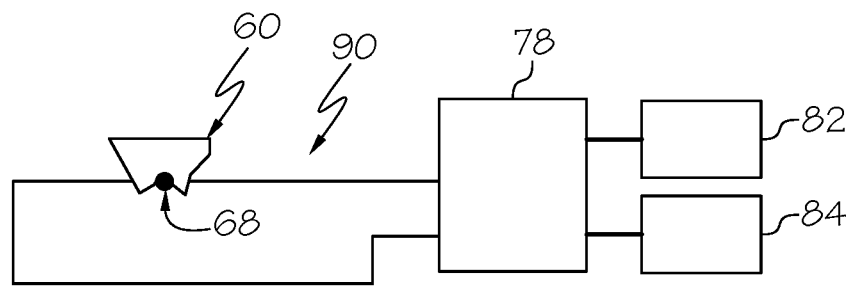
FIG. 3B is another diagrammatic illustration of the truck bed security arrangement of FIG. 3A with the circuit in a closed configuration, according to one or more embodiments shown and described herein.

While FIG. 2 illustrates an embodiment using a sensor as a sensing device, FIGS. 3A and 3B illustrate an example using a circuit 90 as a sensing device that, when closed (FIG. 3B) provides a signal to the locking and security ECU 78. Referring to FIG. 3A, when the latching mechanism 60 is raised from the striker plate 68, the circuit 90 is opened, which is detected by the locking and security ECU 78. Then, the locking and security ECU 78 may activate one or both of the alarm 82 and the indicator 84. Referring to FIG. 3B, when the latching mechanism 60 is engaged with the striker pin 66, the circuit 90 is closed, which is also detected by the locking and security ECU 78 indicating that the truck bed cover 52 is in a closed condition and no alarm indication needs to be provided. As above, the vehicle 10 may send an alert to the operator via a personal computing device, for example, through an application on a smartphone. In some embodiments, other vehicle systems may be activated, such as a camera system to record a video of the truck bed area. In some embodiments, the locking and security ECU 78 may activate the alarm 82 and indicator 84 only if one or more of the vehicle doors are in a locked state.

The above-described truck bed cover security systems monitor the open and closed conditions of the truck bed cover and provide an indication to the operator if the truck bed cover is in an open condition. The truck bed cover security system can be integrated with the vehicle's own OEM security system as opposed to an aftermarket system. Such an integrated arrangement can take advantage of the vehicle's OEM architecture, such as allowing communication with the vehicles locking and security ECU and display, speaker, video and wireless communication systems. Power can be provided to the truck bed system using the vehicle's battery and/or a separate battery, such as a solar charged battery.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle includes a passenger cabin and a truck bed located rearward of the passenger cabin, the vehicle comprising:
   a truck bed cover sized to cover the truck bed and movably attached to one or more walls of the truck bed to allow the truck bed cover to be moved between open and closed positions, the truck bed cover comprising a latching device that engages a striker in the closed position; and
   a sensing device mounted in the truck bed that is configured to provide an indication of an open condition of the truck bed cover to a vehicle locking and security control unit of the vehicle, the locking and security control unit configured to provide an indication using an original equipment manufacturer security system of the vehicle when the open condition is detected, the latching device is configured to engage the sensing device with the truck bed cover in the closed position and disengage the sensing device with the truck bed cover in the open position.

2. The vehicle of claim 1, wherein the sensing device is a sensor located on an accessory rail that is mounted to a tailgate of the truck bed.

3. The vehicle of claim 1, wherein the sensing device is a circuit that is configured to close with the latching device engaged with the striker and open with the latching device disengaged with the striker.

4. The vehicle of claim 1, wherein the striker is mounted to a tailgate of the truck bed.

5. The vehicle of claim 1, wherein the locking and security control unit activates one or both of an audible alarm and a visual indicator if the open condition is detected.

6. The vehicle of claim 1, wherein the locking and security control unit sends a wireless message to a personal computing device if the open condition is detected.

7. A method of providing a truck bed cover alarm system for a truck bed cover that covers a truck bed of a vehicle, the method comprising:
   mounting a sensing device in the truck bed, the sensing device configured to provide an indication of an open condition of the truck bed cover such that a latching device of the truck bed cover engaging the sensing device with the truck bed cover in the closed position and disengaging the sensing device with the truck bed cover in the open position; and
   electrically connecting the sensing device to a locking and security control unit such that the sensing device providing the indication of the open condition of the truck bed cover to the locking and security control unit.

8. The method of claim 7, wherein the step of mounting the sensing device in the truck bed comprises mounting a sensor to an accessory rail and mounting the accessory rail to a tailgate of the truck bed.

9. The method of claim 7, wherein the sensing device is a circuit that is configured to close with the latching device engaged with a striker and open with the latching device disengaged with the striker.

10. The method of claim 9, wherein the striker is mounted to a tailgate of the truck bed.

11. The method of claim 7, wherein the locking and security control unit activating one or both of an audible alarm and a visual indicator if the open condition is detected.

12. The method of claim 7, wherein the locking and security control unit sending a wireless message to a personal computing device if the open condition is detected.

* * * * *